United States Patent
Liu et al.

(10) Patent No.: US 11,905,370 B2
(45) Date of Patent: Feb. 20, 2024

(54) METHOD FOR SYNTHESIZING LONG CARBON CHAIN SEMI-AROMATIC NYLON

(71) Applicant: Zhengzhou University, Zhengzhou (CN)

(72) Inventors: Minying Liu, Zhengzhou (CN); Bingfeng Xue, Zhengzhou (CN); Peng Fu, Zhengzhou (CN); Zhe Cui, Zhengzhou (CN); Xiaomeng Zhang, Zhengzhou (CN); Wei Zhao, Zhengzhou (CN); Xinchang Pang, Zhengzhou (CN); Qingxiang Zhao, Zhengzhou (CN)

(73) Assignee: Zhengzhou University, Zhengzhou (CN)

(*) Notice: Subject to any disclaimer, the term of this patent is extended or adjusted under 35 U.S.C. 154(b) by 242 days.

(21) Appl. No.: 17/477,927

(22) Filed: Sep. 17, 2021

(65) Prior Publication Data

US 2022/0145007 A1 May 12, 2022

(30) Foreign Application Priority Data

Nov. 10, 2020 (CN) .......................... 202011246904.4

(51) Int. Cl.
*C08G 69/30* (2006.01)
*C08G 69/06* (2006.01)
*C08G 69/26* (2006.01)
*C08L 77/00* (2006.01)

(52) U.S. Cl.
CPC ............. *C08G 69/30* (2013.01); *C08G 69/06* (2013.01); *C08G 69/26* (2013.01); *C08L 77/00* (2013.01)

(58) Field of Classification Search
CPC ........ C08G 69/30; C08G 69/06; C08G 69/02; C08L 77/06
See application file for complete search history.

(56) References Cited

U.S. PATENT DOCUMENTS

| | | | |
|---|---|---|---|
| 9,556,310 B2 | 1/2017 | Rulkens et al. | |
| 2010/0267923 A1* | 10/2010 | Cao | C08G 69/26 528/347 |
| 2015/0099080 A1* | 4/2015 | Briffaud | C08L 77/06 524/514 |
| 2016/0137781 A1* | 5/2016 | Rulkens | C08G 69/265 528/340 |

FOREIGN PATENT DOCUMENTS

| | | |
|---|---|---|
| CN | 101768266 A | 7/2010 |
| CN | 103360598 A | 10/2013 |
| CN | 103724209 A | 4/2014 |
| CN | 104327265 A | 2/2015 |
| CN | 104817693 A | 8/2015 |
| CN | 105339415 A | 2/2016 |
| CN | 107383365 A | 11/2017 |
| CN | 109970968 A | 7/2019 |
| CN | 110467724 A | 11/2019 |

* cited by examiner

*Primary Examiner* — Gregory Listvoyb
(74) *Attorney, Agent, or Firm* — Myers Bigel, P.A.

(57) ABSTRACT

The disclosure relates to a synthesis method of long carbon chain semi-aromatic nylon. The synthesis method comprises the following steps: mixing a wet powdery nylon salt, an antioxidant, a catalyst, a surfactant and pellets, and carrying out a one-step solid state polymerization under dynamic mixing to obtain a powdery nylon; under dynamic mixing, enabling the pellets to promote the stirring and mixing of the material and reducing material adhesion to the wall; the one-step solid state polymerization comprises a pre-solid state polymerization and a post-solid state polymerization; in the pre-solid state polymerization, ensuring the nylon salt and the prepolymer not to be molten; in the post-solid state polymerization, gradually reducing the system pressure to vacuum, and keeping the system pressure in vacuum state for at least 1 hour; the temperature of the post-solid state polymerization is not lower than the termination temperature of the pre-solid state polymerization.

16 Claims, 3 Drawing Sheets

METHOD FOR SYNTHESIZING LONG CARBON CHAIN SEMI-AROMATIC NYLON

CROSS REFERENCE TO RELATED APPLICATION

This patent application claims the benefit and priority of Chinese Patent Application No. 202011246904.4 filed on Nov. 10, 2020, the disclosure of which is incorporated by reference herein in its entirety as part of the present application.

TECHNICAL FIELD

The present disclosure belongs to the field of synthesis of semi-aromatic nylon, and specifically relates to a method for synthesizing a long carbon chain semi-aromatic nylon.

BACKGROUND ART

The long carbon chain semi-aromatic nylon (mainly PA10T, PA11T, PA12T, PA13T, PA14T) is a type of semi-aromatic nylon prepared by polycondensation of long carbon chain diamine and terephthalic acid. Compared with the short carbon chain semi-aromatic nylon (PA4T, PA5T and PA6T), the melting points of long carbon chain semi-aromatic nylons are all lower than 350° C. (the temperature at which semi-aromatic nylon starts to decompose during processing is 350° C.), which determines that it can be used alone without introducing a third component for copolymerization, thus maintaining the regularity of the molecular chain; at the same time, the introduction of long carbon chains in the repeating unit makes it have good flexibility. Long carbon chain semi-aromatic nylon not only has good heat resistance, mechanical properties, solvent resistance and chemical resistance, good insulation and low moisture absorption; it also has good toughness and lower melting point, so it has good processing properties and high cost performance. The excellent comprehensive properties of long carbon chain semi-aromatic nylon make it widely used in the automotive and electronic and electrical industries. The market demand is increasing and the application field is gradually expanding.

The commonly used preparation method of long carbon chain semi-aromatic nylon is a "two-step method", that is, a prepolymer with a low molecular weight is synthesized first and then solid state polymerization is performed. However, this polymerization method has many shortcomings, such as: in the prepolymerization, the prepolymer will inevitably have a certain residue in the autoclave, causing each batch of materials to be mixed with the previous batch of materials, which affects the product quality; the solid state polymerization reaction needs high temperature, long time, high energy consumption and low production efficiency, the product is easy to form gel, turn yellow, and even produce black spots, which affects product performance and appearance. In recent years, there have been many patents on the preparation of semi-aromatic nylon by "one-step" polymerization. CN 103360598 A, CN107383365 A, CN 109970968 B introduce the use of the autoclave to prepare a semi-aromatic nylon by "one-step" melt polymerization, but this method has many disadvantages, such as high temperature and energy consumption of polymerization, occurrence of side reactions, the product is easy to form gel and turn yellow, the viscosity of melt is high, it is difficult to discharge, and many residues on the autoclave wall; if things go on like this, black spots will be produced, which will seriously affect its appearance, quality and performance. CN 104327265 A and CN 101768266 A introduce the use of the autoclave to prepare a semi-aromatic nylon by "one-step" solid state polymerization. However, during the polymerization, a block product may be generated due to the melting of some raw materials, which blocks the discharge pipeline, resulting in abnormal discharge. Therefore, it cannot be used in industrial production. CN 105339415 A introduces the use of a closed small cup (the small opening on the small cup lid is used to balance the environmental pressure) to prepare a semi-aromatic nylon by "one-step" solid state polymerization. However, when the temperature is raised under normal pressure, the nylon salt will be decomposed into diamine and diacid, and part of the diamine will be discharged in the form of steam, resulting in an imbalance in the molar ratio of the two and unable to increase the molecular weight of the product. CN 104817693 A introduces the use of a rotary drum reactor for salt formation and polymerization to prepare PA11T, but the PA11T salt is easily soluble in water, that is, the essence of this reaction is a solution polymerization reaction, and the product is easy to stick to the wall and cannot be discharged. CN 110467724 A introduces the use of a rotary drum reactor to prepare a semi-aromatic nylon, which has the following problems: (1) the lowest melting point of nylon 66 prepolymer is only 145° C. (Pierfrancesco Cerruti, et al. Chemiluminescence from oxidation of polyamide 66.1. The oxidation of pure polyamide), which makes the solid state polymerization temperature of nylon salt must be lower than 145° C., otherwise the solid state polymerization cannot proceed smoothly. In Examples 1-3, the initial reaction temperature is directly set to 180° C., nylon 66 prepolymer will melt and stick to the wall, and powdery products cannot be obtained; (2) when the reaction is subjected to stream releasing and vacuuming, there is no relevant designs inside the equipment to prevent the powdery products from going out, which will easily block the pipeline; (3) a baffle plate is installed on the stirring shaft inside the rotary drum reactor, which will seriously affect the maintenance of the equipment and reduce the efficiency of the equipment. In short, the polymerization equipment and method described in this patent have many problems and cannot achieve the intended purpose.

SUMMARY

The purpose of the present disclosure is to provide a method for synthesizing a long carbon chain semi-aromatic nylon, which is a practical industrial scale-up production scheme, the product does not stick to the wall, the apparent shape is white powdery nylon, and it can be directly used for molding processing without further granulation, the overall quality of the product is very good.

In order to achieve the above objective, the technical solution of the method for synthesizing a long carbon chain semi-aromatic nylon of the present disclosure is as follows:

A method for synthesizing a long carbon chain semi-aromatic nylon, comprises the following steps: mixing a wet powdery nylon salt, an antioxidant, a catalyst, a surfactant, and pellets, and performing one-step solid state polymerization under dynamic mixing to obtain a powder nylon;

The wet powder nylon salt has a solvent content of 5-40%, and is prepared by a salt-forming reaction of terephthalic acid and a long carbon chain diamine with 10-14 carbon atoms in a solvent;

The pellets can promote the stirring and mixing of materials and reduce the sticking of materials to the wall under dynamic mixing;

The one-step solid state polymerization includes pre-solid state polymerization and post-solid state polymerization; in the pre-solid state polymerization, temperature of the system is gradually increased from 150-190° C. to 180-220° C. and the nylon salt and a prepolymer are ensured not to melt; solvent vapor pressure is increased to 1.00-2.20 MPa during the period; in the post-solid state polymerization, the system pressure is gradually reduced to vacuum and kept in vacuum for at least 1 h; the temperature of the post-solid state polymerization should not be lower than the termination temperature of the pre-solid state polymerization.

In the method for synthesizing the long carbon chain semi-aromatic nylon of the present disclosure, during the heating process, the solvent vapor will destroy the hydrogen bonds between the nylon salt molecular chains, greatly improving the end group activity, and the significant increase in the proportion of active end groups makes the effective collision times significantly increase, thereby effectively improving the reaction efficiency of polymerization. Adding surfactants can reduce the surface tension and weaken the adhesion between the product and the inner wall; adding pellets not only plays a role of mixing and stirring, but also can collide with the materials that may be adhered to the inner wall of the equipment, avoiding the problem of material sticking to the wall.

The purpose of gradual heating in the pre-solid state polymerization is to further avoid the problem of material sticking to the wall, the principle is as follows: in the pre-solid state polymerization, the degree of polymerization reaction is lower and the melting point of the product is lower, so a lower reaction temperature is required, with the increase of the reaction degree, the melting point of the product will further increase. At this time, under the premise of ensuring that the product does not melt, the reaction temperature can be further increased to accelerate the reaction rate and improve the reaction efficiency.

The product obtained by the above one-step solid state polymerization makes the industrial production of semi-aromatic nylon more convenient and practical. The product is discharged as a powder, indicating that there is basically no melting phenomenon in the solid state polymerization, and the uniformity and controllability of the reaction are very good. After further experimental testing, the melting point, tensile strength, bending strength, bending modulus, thermal deformation temperature, elongation at break and notched impact strength of the product nylon are good, and the overall quality of the product is very good.

In the above preparation methods, the preparation of wet powdery nylon salt can be based on the existing technology, and for details, please refer to the relevant patent application of this research group with the publication number CN103724209A.

In the one-step solid state polymerization, the specific heating rate and the holding time of each temperature section will have varying influences on the intrinsic viscosity, melt index and mechanical properties of the product, which can be adjusted according to the molding requirements of the product. In the pre-solid state polymerization, the solvent in the wet powdery nylon salt is vaporized, and water (steam) is also produced during the polycondensation process, the total solvent vapor pressure can be increased to 1.00-2.20 MPa, which generally corresponds to 0.60-0.95 $P_0$, $P_0$ is the saturated vapor pressure of the solvent at the temperature in the reactor.

Dynamic mixing can be carried out in a rotary drum reactor or other similar equipment. The following synthesis equipment of long carbon chain semi-aromatic nylon can be further used to further improve the reaction efficiency and simplify the operation.

The synthesis equipment of long carbon chain semi-aromatic nylon includes:

A rotary drum reactor which is composed of a circular cylinder and left and right heads;

A rack, rotating to assemble the drum reactor;

A drive device which is connected to the drum reactor in transmission;

A rotation axis of the rotary drum reactor has an angle with the central axis of the cylinder.

An autoclave body of the rotary drum reactor is placed at a certain inclination with the horizontal plane, with the highest point and the lowest point. The materials move randomly inside the autoclave body to make the mixing and reaction uniform.

Preferably, the inner wall of the rotary drum reactor is provided with a baffle plate, which is used to drive the material to rise and promote mixing when the drum reactor rotates. In the process of rotation, the materials and pellets can be carried to a high place by the baffle plate and then fall down, so that the materials are mixed and reacted more uniformly.

Preferably, the synthesis device of long carbon chain semi-aromatic nylon includes a vacuum system and a steam releasing system connected to a rotary drum reactor, and the connection position of the rotary drum reactor with the vacuum system and the steam releasing system is provided with a filter cover, which prevents the material from rushing out of the rotary drum reactor. During the stream releasing and vacuuming process, the powdery material will be dispersed into the external pipeline along with the air flow, and the filter cover can block it from going out, avoiding the problem of material blocking the pipeline.

Preferably, the synthesis device of long carbon chain semi-aromatic nylon further includes a vibrating screen for screening the discharged material. The screen of pellets and powdery nylon can be realized by using vibration, the powdery materials can fall through the vibrating screen and be bagged for later use. The pellets stay on the vibrating screen for recycling.

During the solid state polymerization, the added amount of wet powdery nylon salt can account for 10-40% of the volume of the rotary drum reactor, preferably 30-40%. According to the common sense of the synthesis of semi-aromatic nylon, the system is under anaerobic conditions before the solid state polymerization. Preferably, the reactor is sealed after feeding, the gas inside was replaced with inert gas three times, and the pressure in the reactor is maintained at 0.01-0.05 MPa. Inert gas can be selected from $N_2$, $CO_2$, Ar, etc. The rotating speed of the rotary drum reactor can be set to 3-5 r/min. Correspondingly, the diameter of the pellet is 30-60 mm, the number is 30-80, and the material can be selected from polyether-ether-ketone, polysulfone, polytetrafluoroethylene, polyimide, stainless steel, agate, etc.

The time of pre-solid state polymerization is 2-6 h. In the above time range, the pre-solid state polymerization can meet the requirement that the product does not stick to the wall when the degree of the early polymerization reaction is low and the product melting point is low. More preferably, in the pre-solid state polymerization, gradually increasing the temperature from 150-190° C. to 180-220° C. includes: first holding at 150-190° C. for 0.5-2 h, and then increasing the temperature at a rate of 5-10° C. for 0.5-1 h to increase the temperature to 180-220° C., keeping for 0.5-2 h.

In order to make the post-solid state polymerization proceed uniformly and efficiently, and avoid the product sticking to the wall, it is preferable to gradually reduce the pressure of the system to vacuum, including stream releasing and vacuuming after stream releasing, and the stream releasing time is 1-3 h. More preferably, the temperature is increased to 200-240° C. at a rate of 3-10° C. for 0.5-1 h after 0.5 h of steam releasing. The final reaction temperature of post-solid state polymerization includes but not limited to 200° C., 210° C., 220° C., 230° C., and 240° C.

The vacuum is maintained for 1-6 h. The time for vacuuming includes but not limited to 1 h, 2 h, 4 h, and 6 h. Within the above vacuuming time range, the intrinsic viscosity and melt index of the product have good versatility, which can meet the application requirements in most cases.

In order to better control the reaction degree of the solid state polymerization, preferably, the catalyst is one or more selected from a group consisting of phosphorous acid, sodium hypophosphite, triphenyl phosphate, and H10, and the amount of the catalyst is 0.1-0.5% of the dry mass of wet powdery nylon salt.

In order to optimize the antioxidant properties of the product, preferably, the antioxidant is one or more selected from a group consisting of sodium hypophosphite, 1010, s9228, SH120, and B215, and the amount of antioxidant is 0.1-0.5% of the dry mass of wet powdery nylon salt. The antioxidant is added when synthesizing the semi-aromatic nylon, which can increase the uniformity of the mixing of antioxidants and ensure the appearance and performance of the product.

The surfactant is one or more selected from a group consisting of heavy alkylbenzene sulfonate, (para-position) linear sodium dodecylbenzene sulfonate, fatty alcohol polyoxyethylene ether sodium sulfate, and sodium lauryl sulfate, the amount of surfactant is 0.3-0.8% of the dry mass of the wet powdery nylon salt.

The wet powdery nylon salt is prepared by a method including the following steps: subjecting the long-carbon chain diamine and terephthalic acid to a heat preservation and pressure preservation reaction for 0.5-2 h in a solvent at a temperature of 100-150° C. and a pH value of 7.0-7.5, cooling and discharging, and removing the solvent to obtain a wet powdery nylon salt with a solvent content of 5-40%.

The salt-forming temperature can be adjusted appropriately according to the type of solvent selected. The system is anaerobic before the salt-forming reaction. Preferably, the reactor is sealed after feeding, the gas inside was replaced with inert gas three times, and the pressure in the reactor is maintained at 0.01-0.05 MPa. Inert gas can be selected from $N_2$, $CO_2$, Ar, etc. The salt-forming reaction is carried out under stirring condition, and the stirring speed is 100-200 r/min. The mixed solution of nylon salt obtained by cooling and discharging after the completion of salt-forming reaction will be rapidly stratified, with the lower layer of nylon salt and the upper layer of solvent. There is no limitation on the specific operation method of solvent removal of the mixed solution, for example, the solvent can be removed by centrifugal drying to obtain a wet powdery nylon salt with a certain solvent content. The solvent can be removed to a solvent content of 5-40 wt % as needed. The mass fraction of the solvent in the wet powdery nylon salt includes but not limited to 5%, 10%, 20%, 30%, and 40%.

The solvent in the wet powdery nylon salt is one or more selected from a group consisting of water, ethanol, and methanol.

In order to increase the reaction degree between the long-carbon chain diamine and terephthalic acid, the molar amounts of the two should be as close as possible to avoid the premature termination of the reaction causing by the excessive amount of a certain raw material and the failure to reach the required molecular weight. However, during the polymerization, the nylon salt may be decomposed into diamine and diacid, diamine is easy to volatilize due to its low melting point, resulting in an imbalance in molar ratio. In view of this situation, we can add a certain amount of diamine in the salt-forming process to make up for the loss in the polymerization process. Preferably, the molar ratio of the long carbon chain diamine and terephthalic acid is 1.01-1.03:1. More preferably, 1.01:1.

The mass ratio of the total mass of the long carbon chain diamine and terephthalic acid to the solvent is 1:3-5. Under this condition, it can not only ensure the smooth progress of salt-forming under heat preservation and pressure preservation, but also control the amount of solvent and take into account the cost.

The long carbon chain diamine is one or more selected from a group consisting of decanediamine, undecanediamine, dodecanediamine, tridecanediamine, and tetradecanediamine. The method of the present disclosure is suitable for preparing a variety of long-carbon chain semi-aromatic nylons, and the product not only has good heat resistance, but also has good molding processability. It can be widely used in electronic, electrical, automobile and other industries, and is a new material with good application prospect.

wherein, 1—rack, 2—rotary drum reactor, 3—circulation heat medium temperature control system, 4—gas release system, 5—gas replacement system, 6—vibrating screen, 7—baffle plate, 8—temperature sensor, 9—filter cover, 10—filter, 11—cyclone separator, 12—vacuum buffer tank, 13—vacuum pump, 14—material port.

DETAILED DESCRIPTION OF THE EMBODIMENTS

The implementation of the present disclosure will be further described below in conjunction with specific examples.

Figure 1:
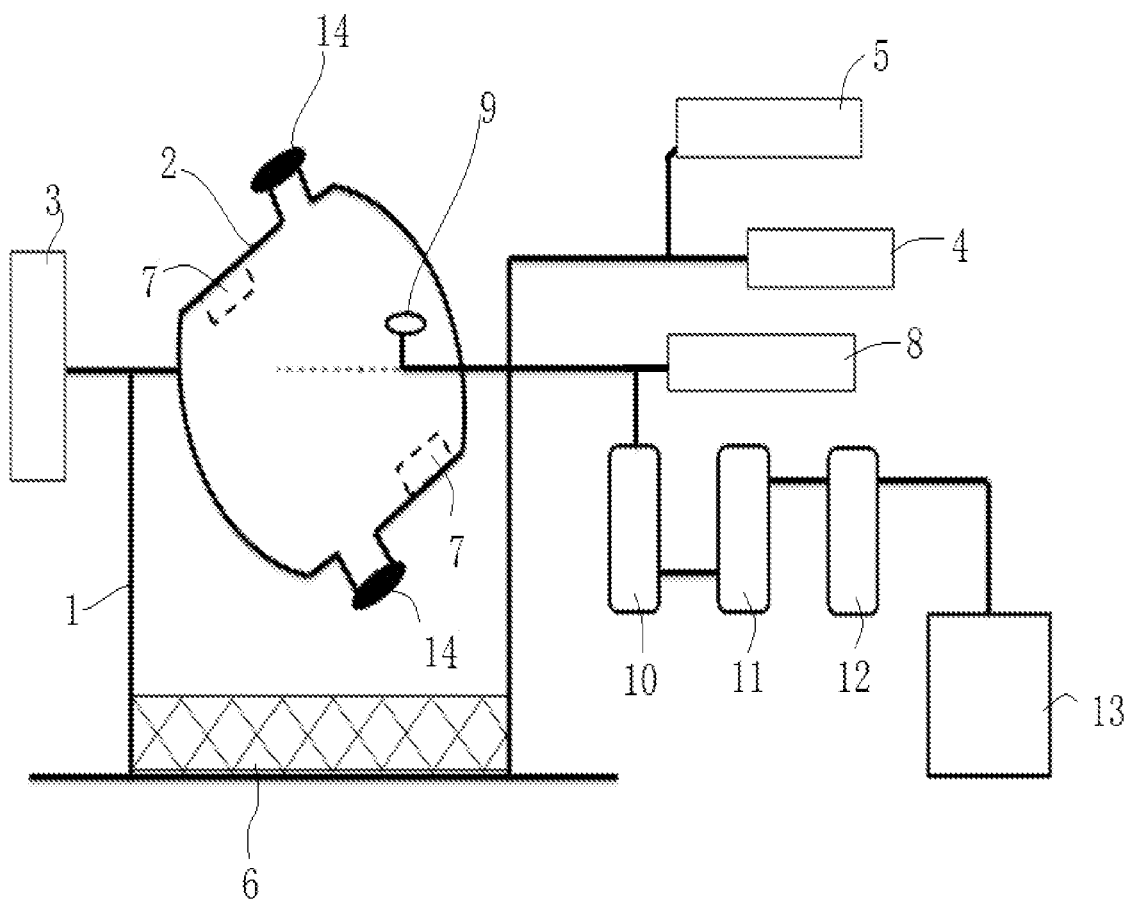
FIG. 1 is a structural schematic diagram of the synthesis device for long carbon chain semi-aromatic nylon used in an embodiment of the present disclosure.

The following example uses the long carbon chain semi-aromatic nylon synthesis device as shown in FIG. 1 to efficiently synthesize long carbon chain semi-aromatic nylon.

Specifically, the volume of the device used in this experiment is 30 L, including the rack 1, the rotary drum reactor 2, the circulating heat medium temperature control system 3, the steam release system 4, the vacuum system, the gas replacement system 5 and the vibrating screen 6.

The rotary drum reactor includes a cylinder and left and right heads, and a baffle plate 7 is provided on the inner wall of the cylinder.

The rotary drum reactor 2 is rotatably assembled on the rack 1 with an included angle between the rotation axis and the central axis of the cylindrical side wall, and the included angle is 0-90°, such as 30-60°. The driving device drives the drum reactor to rotate along the axis of rotation.

The rotary drum reactor is also connected with a circulating heat medium temperature control system 3, a temperature sensor 8, a vacuuming system, a steam release system 4, and a gas replacement system 5. The vacuuming system, the stream release system 4, and the gas replacement system 5 are connected to the rotary drum reactor through the same connecting pipeline, a filter cover 9 is provided at the connection position of the rotary drum reactor and the connecting pipeline, the filter cover 9 can prevent powdery material from rushing out and blocking the pipeline.

The steam release system 4 includes a steam release pipe and a vent valve installed on the steam release pipe. The gas replacement system 5 includes a gas source and a gas replacement pipeline. The vacuuming system includes a filter 10, a cyclone separator 11, a vacuum buffer tank 12 and a vacuum pump 13 which are connected in sequence.

The rotary drum reactor is provided with a material port 14. When discharging, a vibrating screen is installed downstream of the material port 14. The vibrating screen is used to receive the discharge from the rotary drum reactor and screen the pellets and powdery materials.

Example 1

The synthesis method of long carbon chain semi-aromatic nylon of this embodiment includes the following steps:

1) 15 kg of pure water was added to the salt-forming autoclave, 2.76 kg of dodecanediamine and 2.27 kg of terephthalic acid (the molar ratio of 1.01:1) were added, the autoclave was sealed, the gas in the autoclave was replaced with $N_2$ for three times and the pressure inside the autoclave was kept at 0.01 MPa. The stirring motor was turned on and the stirring speed was adjusted to 150 r/min. The autoclave was heated, when the temperature in the autoclave was increased to 140° C., the pH value was 7.2, and the temperature and the pressure were kept for 1 h. The temperature was lowered to obtain a mixed solution of nylon PA12T salt. The mixed solution was dehydrated to prepare a wet powdery nylon PA12T salt with a water content of 10 wt %.

2) 4 kg of the wet powdery nylon PA12T salt obtained in step 1), 12 g of catalyst phosphorous acid, 8 g of antioxidant SH120, 20 g of surfactant heavy alkylbenzene sulfonate and 50 polyether-ether-ketones pellets with a diameter of 40 mm were weighed and placed into the above rotary drum reactor, the reactor was sealed, the gas inside the reactor was replaced with $N_2$ for three times and the pressure in the reactor was maintained at 0.01 MPa. The rotary drum motor was turned on and the rotary drum speed was adjusted to 4 r/min. The reactor was heated, the internal temperature of the reactor was firstly increased to 180° C. and kept for 0.5 h; then the temperature was increased to 210° C. at a rate of 10° C. for 0.5 h, at this time, the internal pressure of the reactor was 1.73 MPa; the temperature and pressure were hold for 1 h; the steam was released, after the steam was released for 0.5 h, the temperature was increased to 220° C. at a rate of 3-4° C. for 0.5 h, the steam release time was 2 h; then vacuum was applied for 2 h. The temperature was reduced and the material was discharged to obtain a white powdery semi-aromatic nylon PA12T.

Example 2

The synthesis method of long carbon chain semi-aromatic nylon of this embodiment includes the following steps:

1) 15 kg of pure water was added to the salt-forming autoclave, 2.57 kg of decanediamine and 2.46 kg of terephthalic acid (the molar ratio of 1.01:1) were added, the autoclave was sealed, the gas in the autoclave was replaced with $CO_2$ for three times and the pressure inside the autoclave was kept at 0.01 MPa. The stirring motor was turned on and the stirring speed was adjusted to 200 r/min. The autoclave was heated, when the temperature in the autoclave was increased to 140° C., the pH value was 7.5, and the temperature and the pressure were kept for 1 h. The temperature was lowered to obtain a mixed solution of nylon PA10T salt. The mixed solution was dehydrated to prepare a wet powdery nylon PA10T salt with a water content of 10 wt %.

2) 4 kg of the wet powdery nylon PA10T salt obtained in step 1), 12 g of catalyst sodium hypophosphite, 8 g of antioxidant s9228, 20 g of surfactant fatty alcohol polyoxyethylene ether sodium sulfate and 40 stainless steel pellets with a diameter of 50 mm were weighed and placed into a homemade rotary drum reactor, the reactor was sealed, the gas inside was replaced with $N_2$ for three times and the pressure in the reactor was maintained at 0.01 MPa. The rotary drum motor was turned on and the rotary drum speed was adjusted to 3 r/min. The reactor was heated, the internal temperature of the reactor was firstly increased to 180° C. and kept for 0.5 h; then the temperature was increased to 210° C. at a rate of 10° C. for 0.5 h, at this time the internal pressure of the reactor was 1.76 MPa; the temperature and pressure were hold for 1 h; the steam was released, after the steam was released for 0.5 h, the temperature was increased to 220° C. at a rate of 3-4° C. for 0.5 h, the steam release time was 2 h; then vacuum was applied for 2 h. The temperature was reduced and the material was discharged to obtain a white powdery semi-aromatic nylon PA10T.

Example 3

The synthesis method of long carbon chain semi-aromatic nylon of this embodiment includes the following steps:

1) 15 kg of pure water was added to the salt-forming autoclave, 2.92 kg of tetradecanediamine and 2.11 kg of terephthalic acid (the molar ratio of 1.01:1) were added, the autoclave was sealed, the gas in the autoclave was replaced with $N_2$ for three times and the pressure inside the autoclave was kept at 0.01 MPa. The stirring motor was turned on and the stirring speed was adjusted to 100 r/min. The autoclave was heated, when the temperature in the autoclave was increased to 140° C., the pH value was 6.7, 36 g of tetradecanediamine was added, the pH value was 7.2 and the condition was kept for 1 h. The temperature was lowered to obtain a mixed solution of nylon PA14T salt. The mixed solution was dehydrated to prepare a wet powdery nylon PA14T salt with a water content of 10 wt %.

2) 4 kg of the wet powdery nylon PA14T salt obtained in step 1), 12 g of catalyst H10, 8 g of antioxidant B215, 20 g of surfactant (para-position) linear sodium dodecyl benzene sulfonate and 50 polytetrafluoroethylene pellets with a diameter of 35 mm were weighed and placed into a homemade rotary drum reactor, the reactor was sealed, the gas inside the reactor was replaced with $N_2$ for three times and the pressure in the reactor was maintained at 0.01 MPa. The rotary drum motor was turned on and the rotary drum speed was adjusted to 5 r/min. The reactor was heated, the internal temperature of the reactor was firstly increased to 180° C. and kept for 0.5 h; then the temperature was stepwise increased to 210° C. at a rate of 10° C. for 0.5 h, at this time the internal pressure of the reactor was 1.69 MPa; the temperature and pressure were hold for 1 h; the steam was released, after the steam was released for 0.5 h, the temperature was increased to 220° C. at a rate of 3-4° C. for 0.5 h, the steam release time was 2 h; then vacuum was applied for 2 h. The temperature was reduced and the material was discharged to obtain a white powdery semi-aromatic nylon PA14T.

Example 4

The new method for synthesizing long carbon chain semi-aromatic nylon in this example is different from Example 1 only in that the vacuum time at the end of the polymerization is different, other formulas and process parameters are the same as those in Example 1. In this example, the vacuum time was 1 h.

Example 5

The new method for synthesizing long carbon chain semi-aromatic nylon in this example is different from Example 1 only in that the vacuum time at the end of the polymerization is different, other formulas and process parameters are the same as those in Example 1. In this example, the vacuum time was 4 h.

Example 6

The new method for synthesizing long carbon chain semi-aromatic nylon in this example is different from Example 1 only in that the vacuum time at the end of the polymerization is different, other formulas and process parameters are the same as those in Example 1. In this example, the vacuum time was 6 h.

Example 7

The new method for synthesizing long carbon chain semi-aromatic nylon in this example is different from Example 1 only in that the final reaction temperature of the steam release stage during the polymerization is different, and other formulas and process parameters are the same as in Example 1. In the example, the final reaction temperature was 210° C., that is, there is no need to increase the temperature during the steam release and vacuum stages.

Example 8

The new method for synthesizing long carbon chain semi-aromatic nylon in this example is different from Example 1 only in that the final reaction temperature of the steam release stage during the polymerization is different, and other formulas and process parameters are the same as in Example 1. In the example, the final reaction temperature was 230° C., that is, after 0.5 h of steam release, the temperature was increased to 230° C. at a rate of (6-7) ° C. for 0.5 h.

Example 9

The new method for synthesizing long carbon chain semi-aromatic nylon in this example is different from Example 1 only in that the water content of the nylon salt is different, and other formulas and process parameters are the same as in Example 1. In this example, the water content of the nylon salt was 8 wt % (320 g water in the rotary drum reactor).

Example 10

The new method for synthesizing long carbon chain semi-aromatic nylon in this example is different from Example 1 only in that the water content of the nylon salt is different, and other formulas and process parameters are the same as in Example 1. In this example, the water content of the nylon salt was 12 wt % (480 g water in the rotary drum reactor).

Example 11

The new method for synthesizing long carbon chain semi-aromatic nylon in this example is different from Example 1 only in that the amount of catalyst is different, and other formulations and process parameters are the same as in Example 1. In this example, the amount of catalyst was 5 g.

Example 12

The new method for synthesizing long carbon chain semi-aromatic nylon in this example is different from Example 1 only in that the amount of catalyst is different, and other formulas and process parameters are the same as in Example 1. In this example, the amount of catalyst was 25 g.

Example 13

The synthesis method of long carbon chain semi-aromatic nylon of this embodiment includes the following steps:

1) 15 kg of ethanol was added to the salt-forming autoclave, 2.76 kg of dodecanediamine and 2.27 kg of terephthalic acid (the molar ratio of 1.01:1) were added, the autoclave was sealed, the gas in the autoclave was replaced with $N_2$ three times, and the pressure inside the autoclave was kept at 0.01 MPa. The stirring motor was turned on and the stirring speed was adjusted to 150 r/min. The autoclave was heated, when the temperature in the autoclave was increased to 120° C., the pH value was 7.2, and the temperature and the pressure were kept for 1 h. The temperature was lowered to obtain a mixed solution of nylon PA12T salt. The mixed solution was subjected to ethanol removal to prepare a wet powdery nylon PA12T salt with an ethanol content of 10 wt %.

2) 4 kg of the wet powdery nylon PA12T salt obtained in step 1), 12 g of catalyst triphenyl phosphate, 8 g of antioxidant s9228, 20 g of surfactant sodium lauryl sulfate and 40 agate balls with a diameter of 40 mm were weighed and placed into a homemade rotary drum reactor, the reactor was sealed, the gas inside the reactor was replaced with Ar three times and the pressure in the reactor was maintained at 0.01 MPa. The rotary drum motor was turned on and the rotary drum speed was adjusted to 4 r/min. The reactor was heated, the internal temperature of the reactor was firstly increased to 160° C. and kept for 0.5 h; then the temperature was stepwise increased to 190° C. at a rate of 10° C. for 0.5 h, at this time the internal pressure of the reactor was 2.06 MPa; the temperature and pressure were hold for 1 h; the steam was released, after the steam was released for 0.5 h, the temperature was increased to 220° C. at a rate of 10° C. for 0.5 h, the steam release time was 2 h; then vacuum was applied for 2 h. The temperature was reduced and the material was discharged to obtain a white powdery semi-aromatic nylon PA12T.

Example 14

The synthesis method of long carbon chain semi-aromatic nylon of this embodiment includes the following steps:

1) 15 kg of pure water was added to the salt-forming autoclave, 0.30 kg of dodecanediamine, 2.29 kg of decanediamine and 2.43 kg of terephthalic acid (the molar ratio of diamine to diacid of 1.01:1, the molar ratio of PA10T salt to PA12T salt of 9:1) were added, the autoclave was sealed, the gas in the autoclave was replaced with $N_2$ three times, and the pressure inside the autoclave was kept at 0.01 MPa. The stirring motor was turned on and the stirring speed was adjusted to 150 r/min. The autoclave was heated, when the temperature in the autoclave was increased to 140° C., the pH value was 7.2, and the temperature and the pressure were kept for 1 h. The temperature was lowered to obtain a mixed solution of nylon PA10T/12T salt. The mixed solution was dehydrated to prepare a wet powdery nylon PA10T/12T salt with a water content of 10 wt %.

2) 4 kg of the wet powdery nylon PA10T/12T salt obtained in step 1), 12 g of catalyst sodium hypophosphite, 8 g of antioxidant SH120, 20 g of surfactant heavy alkylbenzene sulfonate and 50 polyether-ether-ketone pellets with a diameter of 40 mm were weighed and placed into a homemade rotary drum reactor, the reactor was sealed, and the gas inside the reactor was replaced with $N_2$ three times and the pressure in the reactor was maintained at 0.01 MPa. The rotary drum motor was turned on and the rotary drum speed was adjusted to 4 r/min. The reactor was heated, the internal temperature of the reactor was firstly increased to 180° C. and kept for 0.5 h; then the temperature was increased to 220° C. at a rate of 10° C. for 0.5 h, at this time the internal pressure of the reactor was 1.75 MPa; the temperature and pressure were hold for 1 h; the steam was released, after the steam was released for 0.5 h, the temperature was increased to 230° C. at a rate of 3-4° C. for 0.5 h, the steam release time was 2 h; then vacuum was applied for 2 h. The temperature was reduced and the material was discharged to obtain a white powdery semi-aromatic nylon PA10T/12T.

2. Explanation of the Comparative Example

Comparative Example 1

The new method for synthesizing long carbon chain semi-aromatic nylon in this comparative example is different from Example 1 only in that the water content of the nylon salt is different, and other formulas and process parameters are the same as in Example 1. In this comparative example, the water content of the nylon salt is zero.

Comparative Example 2

The new method for synthesizing long carbon chain semi-aromatic nylon in this comparative example is different from Example 1 only in that the vacuum time in the late polymerization stage is different. Other formulas and process parameters are the same as in Example 1. In this comparative example, the vacuum time is zero.

3. Experimental Example

Experimental Example 1

Figure 2:
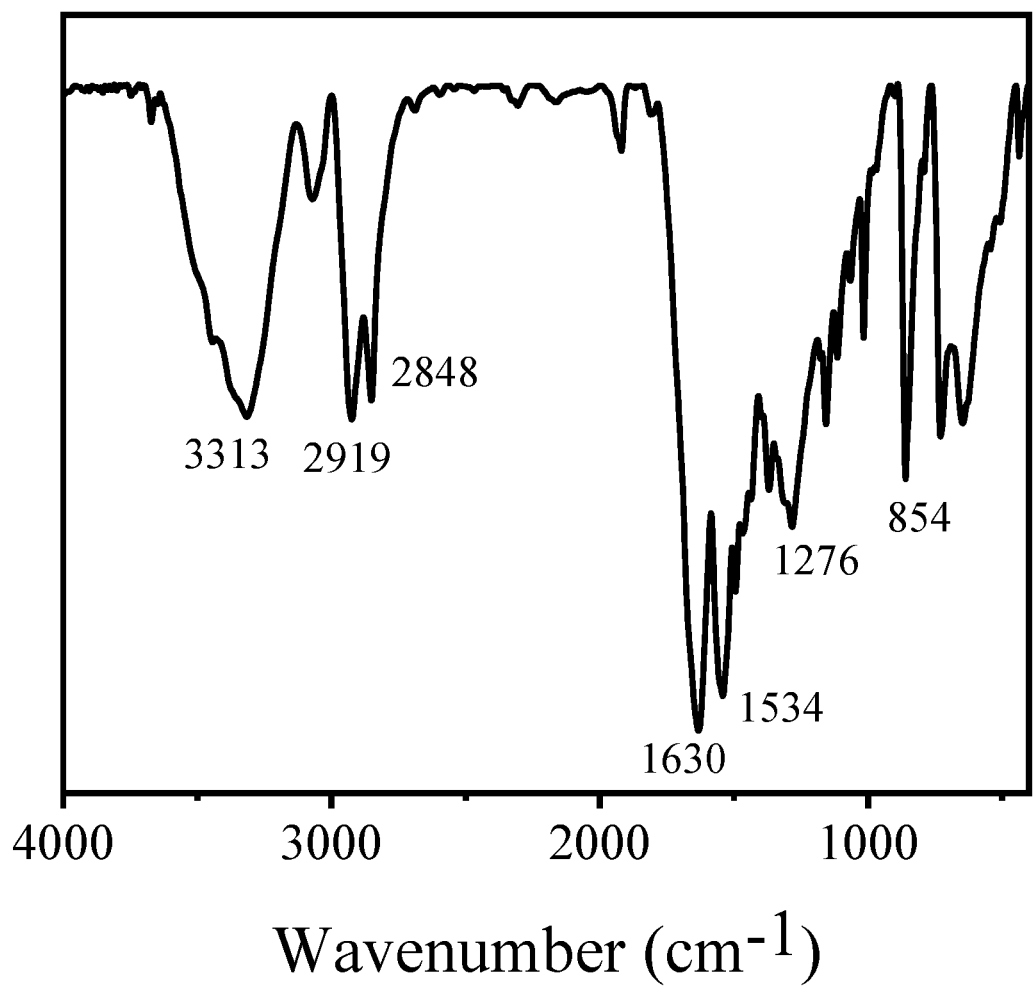
FIG. 2 is the FT-IR image of the semi-aromatic nylon PA12T obtained in Example 1 of the present disclosure.
Figure 3:
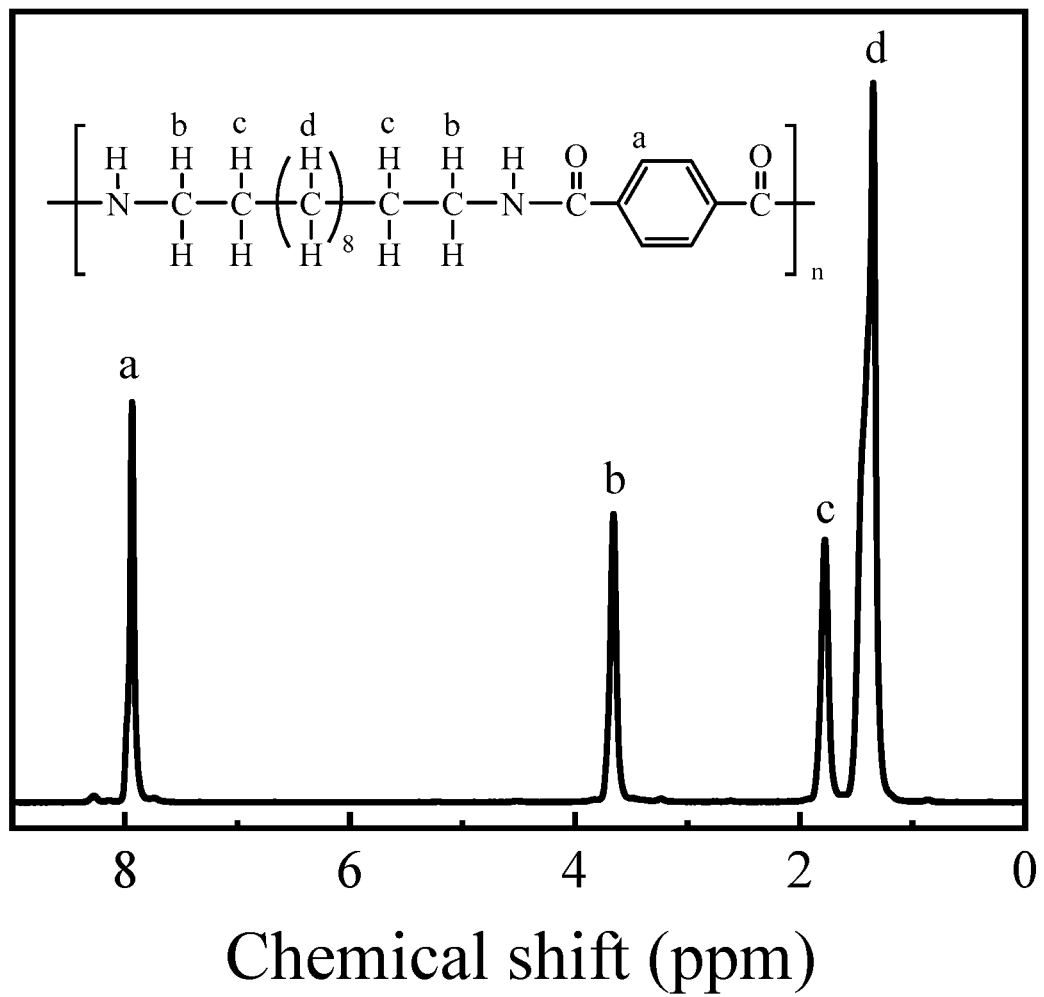
FIG. 3 is the $^1$H-NMR image of the semi-aromatic nylon PA12T obtained in Example 1 of the present disclosure.

The semi-aromatic nylon PA12T obtained in Example 1 was tested by FT-IR and $^1$H-NMR test, the results are shown in FIG. 2 and FIG. 3.

In FIG. 2, 3313 $cm^{-1}$ is the stretching vibration peak of N—H, 2919 $cm^{-1}$ and 2848 $cm^{-1}$ is the stretching vibration peak of $CH_2$, 1630 $cm^{-1}$ is the stretching vibration peak of C=O (amide I band), 1534 $cm^{-1}$ is the in-plane bending vibration peak of N—H (amide II band), 1276 $cm^{-1}$ is the stretching vibration peak of C—N(amide III band), 854 $cm^{-1}$ is the out-of-plane bending vibration peak of =CH on the benzene ring.

FIG. 3 shows the chemical shift of each H.

From the results of FIG. 2 and FIG. 3, it can be seen that the white powdery product obtained in Example 1 is a semi-aromatic nylon PA12T.

Experimental Example 2

The melting point, intrinsic viscosity, melt index, mechanical properties, and thermal deformation temperature of the products obtained in each example were characterized. The test equipment and test standards used for each characterization are shown in Table 1.

TABLE 1

Product test items, test equipment and test standards

| Test items | Test equipment | Test standard |
|---|---|---|
| Melting point | DSC (PE-8500) | 10° C./min |
| Intrinsic viscosity | Ubbelohde viscometer | GB/T 12006.1-2009 |
| Melt flow rate | Melt flow rate tester (ZRZ2452) | GB/T 3682-2000 |
| Tensile strength Elongation at break | Microcomputer controlled electronic universal tester (CMT4204) | GB/T 1040.2-2006 |
| Bending strength Bending modulus | | GB/T 9341-2008 |
| Notched impact strength | Pendulum impact tester (ZBC8400-B) | GB/T 1043.1-2008 |
| Thermal deformation temperature | Thermal deformation VEKA softening point tester (ZWK 1302-A) | GB/T 1634.2-2004 |

The performance test results of the long carbon chain semi-aromatic nylon of Examples 1-3 are shown in Table 2.

TABLE 2

Properties of long carbon chain semi-aromatic nylon obtained in Example 1-3.

| Items | Example 1 | Example 2 | Example 3 |
|---|---|---|---|
| Product status | powdery | powdery | powdery |
| Color | white | white | white |
| Melting point (° C.) | 318 | 334 | 302 |
| Intrinsic viscosity (dL/g) | 0.72 | 0.64 | 0.97 |
| Melt flow rate (g/10 min) | 29 | 20 | 34 |
| Tensile strength (MPa) | 73 | 86 | 58 |
| Elongation at break (%) | 56 | 34 | 72 |
| Bending strength (MPa) | 48 | 55 | 42 |
| Bending modulus (GPa) | 1.52 | 1.74 | 1.27 |
| Notched impact strength ($kJ/m^2$) | 9.3 | 8.1 | 11.7 |
| Thermal deformation temperature (1.8 MPa, ° C.) | 118 | 123 | 112 |

In Table 2, three long carbon chain semi-aromatic nylons PA12T, PA10T and PA14T are all discharged in powdery form, which indicates that solid state polymerization has occurred during this process, there is basically no melting phenomenon, and the color of the product is white. As the number of carbon atoms in the diamine increases, the melting point, tensile strength, bending strength, bending modulus, and thermal deformation temperature of the corresponding nylon product gradually decrease, and the elongation at break and notched impact strength gradually increase, which is also in accordance with the theory.

The melting point of the obtained PA12T and PA1 OT is higher than that of the product obtained by traditional "two-step method" ("Synthesis and characterization of PA10T and its copolymer (319° C.)" and "Synthesis, characterization and performance of semi-aromatic high-temperature nylon PA12T (293° C.)"), which is related to the polymerization method and product structure.

The above analysis shows that the new "one-step" solid state polymerization is very suitable for the production of long carbon chain semi-aromatic nylon, and the product quality is very good.

The properties of long carbon chain semi-aromatic nylon obtained in Example 1 and Example 4-6 with vacuum time of 2 h, 1 h, 4 h and 6 h respectively, as shown in Table 3.

TABLE 3

Properties of long carbon chain semi-aromatic nylon obtained in Example 1 and Examples 4-6

| Items | Example 4 | Example 1 | Example 5 | Example 6 |
|---|---|---|---|---|
| Product status | powdery | powdery | powdery | powdery |
| Color | white | white | white | white |
| Melting point (° C.) | 319 | 318 | 318 | 320 |
| Intrinsic viscosity (dL/g) | 0.55 | 0.72 | 1.02 | 1.21 |
| Melt flow rate (g/10 min) | 43 | 29 | 17 | 8 |
| Tensile strength (MPa) | 58 | 73 | 75 | 74 |
| Elongation at break (%) | 13 | 56 | 53 | 55 |
| Bending strength (MPa) | 36 | 48 | 49 | 51 |
| Bending modulus (GPa) | 1.17 | 1.52 | 1.58 | 1.63 |
| Notched impact strength (kJ/m$^2$) | 4.6 | 9.3 | 9.1 | 9.0 |
| Thermal deformation temperature (1.8 MPa, ° C.) | 117 | 118 | 119 | 122 |

It can be seen from Table 3 that with the extension of the vacuum time, the intrinsic viscosity of PA12T gradually increases and the melt index gradually decreases, but other properties remain basically unchanged.

Example 1, Example 7, and Example 8 reflect the effect of the final reaction temperature of postsolid state polymerization on the product performance. Example 1 is that the temperature is increased to 220° C. at a rate of 3-4° C. for 0.5 h after the steam is released for 0.5 h, and the final reaction temperature is kept at 220° C.; Example 7 is that there is no temperature rise during the steam release and vacuuming stages, and the final reaction temperature is maintained at 210° C.; Example 8 is that the temperature is increased to 230° C. at a rate of (6-7°) C. for 0.5 h after the steam is released for 0.5 h, and the final reaction temperature is kept at 230° C., and the specific results are shown in Table 4.

TABLE 4

Properties of long carbon chain semi-aromatic nylon obtained in Example 1 and Examples 7-8

| Items | Example 7 | Example 1 | Example 8 |
|---|---|---|---|
| Product status | powdery | powdery | powdery |
| Color | white | white | white |
| Melting point (° C.) | 319 | 318 | 317 |
| Intrinsic viscosity (dL/g) | 0.51 | 0.72 | 1.12 |
| Melt flow rate (g/10 min) | 47 | 29 | 22 |
| Tensile strength (MPa) | 66 | 73 | 74 |
| Elongation at break (%) | 43 | 56 | 51 |
| Bending strength (MPa) | 42 | 48 | 48 |
| Bending modulus (GPa) | 1.31 | 1.52 | 1.55 |
| Notched impact strength (kJ/m$^2$) | 8.4 | 9.3 | 9.3 |
| Thermal deformation temperature (1.8 MPa, ° C.) | 116 | 118 | 121 |

It can be seen from Table 4 that as the reaction temperature increases, the intrinsic viscosity of PA12T gradually increases and the melt index gradually decreases, but other properties remain basically unchanged.

Example 1 and Examples 9-10 reflect the influence of the solvent content in the wet powdery nylon salt on the product performance. The solvent content of the wet powdery nylon salt in Example 1, Example 9 and Example 10 are 10 wt %, 8 wt %, 12 wt %, respectively, the specific results are shown in Table 5.

TABLE 5

Properties of long carbon chain semi-aromatic nylons in Example 1 and Examples 9-10

| Items | Example 9 | Example 1 | Example 10 |
|---|---|---|---|
| Product status | powdery | powdery | powdery |
| Color | white | white | white |
| Melting point (° C.) | 318 | 318 | 319 |
| Intrinsic viscosity (dL/g) | 0.60 | 0.72 | 0.95 |
| Melt flow rate (g/10 min) | 42 | 29 | 20 |
| Tensile strength (MPa) | 69 | 73 | 74 |
| Elongation at break (%) | 48 | 56 | 53 |
| Bending strength (MPa) | 44 | 48 | 49 |
| Bending modulus (GPa) | 1.42 | 1.52 | 1.52 |
| Notched impact strength (kJ/m$^2$) | 8.6 | 9.3 | 9.2 |
| Thermal deformation temperature (1.8 MPa, ° C.) | 117 | 118 | 120 |

It can be seen from Table 5 that when the solvent (water) content of the wet powdery nylon salt is not less than 8 wt %, PA12T salt can react to form PA12T, and as the water content increases, the intrinsic viscosity of PA12T gradually increases, and the melt flow rate gradually decreases, but other properties remain basically unchanged.

Example 1 and Examples 11-12 reflect the effects of different catalyst dosages on product performance, wherein, the catalyst dosages of Example 11, Example 1, and Example 12 are 5 g, 12 g, and 25 g, respectively. The specific results are shown in Table 6.

TABLE 6

Properties of long carbon chain semi-aromatic nylon obtained in Example 1 and Examples 11-12

| Items | Example 11 | Example 1 | Example 12 |
|---|---|---|---|
| Product status | powdery | powdery | powdery |
| Color | white | white | white |

TABLE 6-continued

Properties of long carbon chain semi-aromatic
nylon obtained in Example 1 and Examples 11-12

| Items | Example 11 | Example 1 | Example 12 |
|---|---|---|---|
| Melting point (° C.) | 318 | 318 | 319 |
| Intrinsic viscosity (dL/g) | 0.61 | 0.72 | 1.02 |
| Melt flow rate (g/10 min) | 40 | 29 | 22 |
| Tensile strength (MPa) | 69 | 73 | 74 |
| Elongation at break (%) | 51 | 56 | 53 |
| Bending strength (MPa) | 46 | 48 | 49 |
| Bending modulus (GPa) | 1.82 | 1.52 | 1.52 |
| Notched impact strength (kJ/m$^2$) | 8.8 | 9.3 | 9.2 |
| Thermal deformation temperature (1.8 MPa, ° C.) | 118 | 118 | 120 |

It can be seen from Table 6 that as the amount of catalyst increases, the intrinsic viscosity of PA12T gradually increases and the melt flow rate gradually decreases, but other properties remain basically unchanged.

The solvent of the PA12T salt used in Example 13 is ethanol, and the properties of the obtained semi-aromatic nylon PA12T are shown in Table 7.

TABLE 7

Properties of long carbon chain semi-aromatic
nylon obtained in Examples 1 and 13

| Items | Example 1 | Example 13 |
|---|---|---|
| Product status | powdery | powdery |
| Color | white | white |
| Melting point (° C.) | 318 | 319 |
| Intrinsic viscosity (dL/g) | 0.72 | 0.74 |
| Melt flow rate (g/10 min) | 29 | 29 |
| Tensile strength (MPa) | 73 | 72 |
| Elongation at break (%) | 56 | 54 |
| Bending strength (MPa) | 48 | 49 |
| Bending modulus (GPa) | 1.52 | 1.55 |
| Notched impact strength (kJ/m$^2$) | 9.3 | 9.6 |
| Thermal deformation temperature (1.8 MPa, ° C.) | 118 | 121 |

It can be seen from Table 7 that the change of solvent type has little effect on the performance of PA12T.

TABLE 8

Properties of long carbon chain semi-aromatic
nylon obtained in Examples 1 and 14

| Items | Example 1 | Example 14 |
|---|---|---|
| Product status | powdery | powdery |
| Color | white | white |
| Melting point (° C.) | 318 | 319 |
| Intrinsic viscosity (dL/g) | 0.72 | 0.76 |
| Melt flow rate (g/10 min) | 29 | 27 |
| Tensile strength (MPa) | 73 | 76 |
| Elongation at break (%) | 56 | 47 |
| Bending strength (MPa) | 48 | 51 |
| Bending modulus (GPa) | 1.52 | 1.69 |
| Notched impact strength (kJ/m$^2$) | 9.3 | 8.5 |
| Thermal deformation temperature (1.8 MPa, ° C.) | 118 | 122 |

It can be seen from Table 8 that the device and experimental scheme are also suitable for the synthesis of copolymerized long carbon chain semi-aromatic nylon, and the performance of product is excellent.

In Comparative Example 1, the water content of the nylon salt is 0, and in Comparative Example 2, the vacuum time is 0. The properties of the long carbon chain semi-aromatic nylon obtained in Example 1, Comparative Example 1, and Comparative Example 2 are shown in Table 9.

TABLE 9

Properties of long carbon chain semi-aromatic nylon
obtained in Example 1, Comparative Examples 1-2

| Items | Example 1 | Comparative Example 1 | Comparative Example 2 |
|---|---|---|---|
| Product status | powdery | powdery | powdery |
| Color | white | white | white |
| Melting point (° C.) | 318 | 273 | 318 |
| Intrinsic viscosity (dL/g) | 0.72 | 0.04 | 0.25 |
| Comment | — | no polymerization occurred | low molecular weight, cannot be injection molded |

It can be seen from the results in Table 9 that in Comparative Example 1, when the water content of the nylon salt is 0, no polymerization reaction occurs; in Comparative Example 2, the intrinsic viscosity is only 0.25 dL/g without vacuuming, which is much lower than that of Example 1 and cannot be injection molded.

What is claimed is:

1. A method for synthesizing a long carbon chain semi-aromatic nylon, wherein the method comprises:
    mixing a wet powdery nylon salt, an antioxidant, a catalyst, a surfactant, and pellets and carrying out a one-step solid state polymerization under dynamic mixing to obtain a powdery nylon,
    wherein the wet powdery nylon salt has a solvent content of 5-40% wt, and is prepared by salt-forming reaction of terephthalic acid and a long carbon chain diamine with 10-14 carbon atoms in the solvent,
    wherein the pellets promote stirring and mixing of materials and reduce sticking of materials to a wall under dynamic mixing,
    wherein the one-step solid state polymerization includes pre-solid state polymerization and post-solid state polymerization; in the pre-solid state polymerization, gradually increasing temperature of the system from 150-190° C. to 180-220° C., ensuring the nylon salt and the prepolymer not to be molten, and increasing the solvent vapor pressure to 1.00-2.20 MPa during the period; in the post-solid state polymerization, gradually reducing the system pressure to vacuum and holding for at least 1 h; the temperature of the post-solid state polymerization should not be lower than the termination temperature of the pre-solid state polymerization; and
    wherein, in the pre-solid state polymerization, gradually increasing the temperature from 150-190° C. to 180-220° C. includes: holding the temperature at 150-190° C. for 0.5-2 h, then increasing the temperature to 180-220° C. at a rate of 5-10° C. for 0.5-1 h, and holding for 0.5-2 h.

2. The method for synthesizing the long carbon chain semi-aromatic nylon according to claim 1, wherein the time of the pre-solid state polymerization is 2-6 h.

3. The method for synthesizing the long carbon chain semi-aromatic nylon according to claim 1, wherein gradually reducing the system pressure to vacuum comprises steam releasing and vacuuming after steam releasing, and the stream releasing time is 1-3 h.

4. The method for synthesizing the long carbon chain semi-aromatic nylon according to claim 3, wherein the temperature is increased to 200-240° C. at a rate of 3-10° C. for 0.5-1 h after steam releasing for 0.5 h.

5. The method for synthesizing the long carbon chain semi-aromatic nylon according to claim 1, wherein the vacuum holding time is 1-6 h.

6. The method for synthesizing the long carbon chain semi-aromatic nylon according to claim 2, wherein the vacuum holding time is 1-6 h.

7. The method for synthesizing the long carbon chain semi-aromatic nylon according to claim 3, wherein the vacuum holding time is 1-6 h.

8. The method for synthesizing the long carbon chain semi-aromatic nylon according to claim 4, wherein the vacuum holding time is 1-6 h.

9. The method for synthesizing the long carbon chain semi-aromatic nylon according to claim 1, wherein the catalyst is one or more selected from a group consisting of phosphorous acid, sodium hypophosphite, triphenyl phosphate, and H10, and an amount of the catalyst is 0.1-0.5% of the dry mass of the wet powdery nylon salt.

10. The method for synthesizing the long carbon chain semi-aromatic nylon according to claim 1, wherein the antioxidant is one or more selected from a group consisting of sodium hypophosphite, 1010, s9228, SH120, and B215, and an amount of the antioxidant is 0.1-0.5% of the dry mass of the wet powdery nylon salt.

11. The method for synthesizing the long carbon chain semi-aromatic nylon according to claim 1, wherein the solvent in the wet powdery nylon salt is one or more selected from a group consisting of water, ethanol, and methanol.

12. The method for synthesizing the long carbon chain semi-aromatic nylon according to claim 1, wherein the long carbon chain diamine is one or more selected from a group consisting of decanediamine, undecanediamine, dodecanediamine, tridecanediamine, and tetradecanediamine.

13. The method for synthesizing the long carbon chain semi-aromatic nylon according to claim 9, wherein the long carbon chain diamine is one or more selected from a group consisting of decanediamine, undecanediamine, dodecanediamine, tridecanediamine, and tetradecanediamine.

14. The method for synthesizing the long carbon chain semi-aromatic nylon according to claim 10, wherein the long carbon chain diamine is one or more selected from a group consisting of decanediamine, undecanediamine, dodecanediamine, tridecanediamine, and tetradecanediamine.

15. The method for synthesizing the long carbon chain semi-aromatic nylon according to claim 11, wherein the long carbon chain diamine is one or more selected from a group consisting of decanediamine, undecanediamine, dodecanediamine, tridecanediamine, and tetradecanediamine.

16. A method for synthesizing a long carbon chain semi-aromatic nylon, wherein the method comprises:
mixing a wet powdery nylon salt, an antioxidant, a catalyst, a surfactant, and pellets and carrying out a one-step solid state polymerization under dynamic mixing to obtain a powdery nylon,
wherein the wet powdery nylon salt has a solvent content of 5-40% wt, and is prepared by salt-forming reaction of terephthalic acid and a long carbon chain diamine with 10-14 carbon atoms in the solvent,
wherein the pellets promote stirring and mixing of materials and reduce sticking of materials to a wall under dynamic mixing,
wherein the one-step solid state polymerization includes pre-solid state polymerization and post-solid state polymerization; in the pre-solid state polymerization, gradually increasing temperature of the system from 150-190° C. to 180-220° C., ensuring the nylon salt and the prepolymer not to be molten, and increasing the solvent vapor pressure to 1.00-2.20 MPa during the period; in the post-solid state polymerization, gradually reducing the system pressure to vacuum and holding for at least 1 h; the temperature of the post-solid state polymerization should not be lower than the termination temperature of the pre-solid state polymerization;
wherein gradually reducing the system pressure to vacuum comprises steam releasing and vacuuming after stream releasing, and the steam releasing time is 1-3 h; and
wherein the temperature of the post-solid state polymerization is increased to 200-240° C. at a rate of 3-10° C. for 0.5-1 h after steam releasing for 0.5 h.

* * * * *